United States Patent
Dankers et al.

(10) Patent No.: US 10,260,937 B2
(45) Date of Patent: Apr. 16, 2019

(54) FIBER OPTIC SENSOR SHAPED FOR A PARTICULAR FREQUENCY RESPONSE AND METHOD OF MANUFACTURING SAME

(71) Applicant: Hifi Engineering Inc., Calgary (CA)

(72) Inventors: Arne Dankers, Calgary (CA); Seyed Ehsan Jalilian, Calgary (CA)

(73) Assignee: Hifi Engineering Inc., Calgary, Alberta (CA)

( * ) Notice: Subject to any disclaimer, the term of this patent is extended or adjusted under 35 U.S.C. 154(b) by 0 days.

(21) Appl. No.: 15/739,651

(22) PCT Filed: Jun. 27, 2016

(86) PCT No.: PCT/CA2016/050750
§ 371 (c)(1),
(2) Date: Dec. 22, 2017

(87) PCT Pub. No.: WO2016/205955
PCT Pub. Date: Dec. 29, 2016

(65) Prior Publication Data
US 2018/0164151 A1 Jun. 14, 2018

Related U.S. Application Data

(60) Provisional application No. 62/184,657, filed on Jun. 25, 2015.

(51) Int. Cl.
*G01H 9/00* (2006.01)
*G01D 5/26* (2006.01)
*G01D 5/353* (2006.01)
*G02B 6/02* (2006.01)

(52) U.S. Cl.
CPC ............. *G01H 9/004* (2013.01); *G01D 5/268* (2013.01); *G01D 5/35374* (2013.01); *G02B 6/0208* (2013.01)

(58) Field of Classification Search
None
See application file for complete search history.

(56) References Cited

U.S. PATENT DOCUMENTS

| | | |
|---|---|---|
| 5,825,489 A | 10/1998 | Lagakos et al. |
| 7,463,555 B2 | 12/2008 | Bevan et al. |
| 7,687,764 B1 | 3/2010 | Knapp |

OTHER PUBLICATIONS

International Search Report and Written Opinion of the International Searching Authority, dated Sep. 15, 2016, for corresponding International Application No. PCT/CA2016/050750, 8 pages.

*Primary Examiner* — Jerry Rahll
(74) *Attorney, Agent, or Firm* — Klarquist Sparkman, LLP

(57) ABSTRACT

Sensor shaped to have a frequency response that has less spectral fading than a sensor with a rectangular wrapping pattern, and methods for making such sensors, are disclosed. One such method includes selecting a wrapping pattern comprising multiple layers in which a top layer has a different length than a bottom layer and where the bottom layer is adjacent a mandrel. The method further includes wrapping optical fiber around the mandrel according to the wrapping pattern.

17 Claims, 14 Drawing Sheets

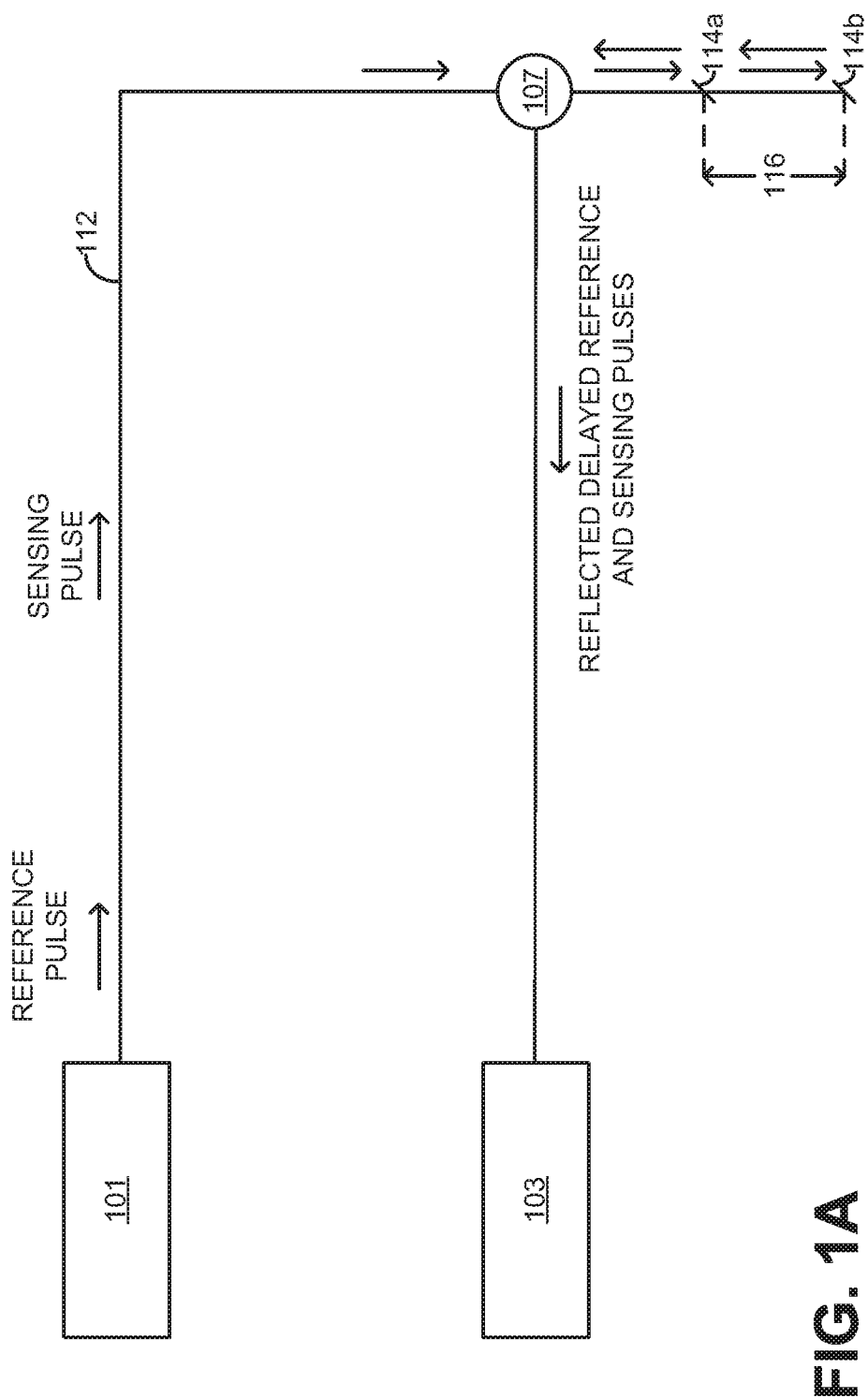

FIBER OPTIC SENSOR SHAPED FOR A PARTICULAR FREQUENCY RESPONSE AND METHOD OF MANUFACTURING SAME

CROSS REFERENCE TO RELATED APPLICATIONS

This is the U.S. National Stage of International Application No. PCT/CA2016/050750, filed Jun. 27, 2016, which in turn claims the benefit of U.S. Provisional Application No. 62/184,657, filed Jun. 25, 2015. The provisional application is incorporated herein in its entirety.

TECHNICAL FIELD

The present disclosure relates to the field of fiber optic sensors and, more particularly, to shaping a frequency response for fiber optic sensors.

BACKGROUND

Fiber optic cables are often used for distributed measurement systems in acoustic sensing applications. Acoustic sensors may be formed by wrapping a segment of fiber optic cable around a core. The length of cable wrapped around the core affects the sensitivity of the sensor.

Pressure changes, due to sound waves for example, in the space immediately surrounding an optical fiber and that encounter the optical fiber, cause dynamic strain in the optical fiber. Optical interferometry may be used to detect the dynamic strain along a segment of the fiber. Optical interferometry is a technique in which two separate light pulses, a sensing pulse and a reference pulse, are generated and interfere with each other. The sensing and reference pulses may, for example, be directed along an optical fiber that comprises fiber Bragg gratings on either side of the core around which the optical fiber wraps. The fiber Bragg gratings partially reflect the pulses back towards an optical receiver at which an interference pattern is observed.

The nature of the interference pattern observed at the optical receiver provides information on the optical path length the pulses traveled, which in turn provides information on parameters such as the strain the segment of optical fiber between the fiber Bragg gratings experienced. Information on the strain then provides information about the event that caused the strain. Analysis of the event allows determination of, for example, a frequency response of the event detected by the sensor. There exists a continued desire to advance and improve technology used in fiber optic sensors.

SUMMARY

In accordance with an illustrative embodiment of the disclosure, there is provided a method for making an acoustic sensor with a frequency response that has less spectral fading than a sensor with a rectangular wrapping pattern, the rectangular wrapping pattern having a rectangular cross-section. The method includes selecting a wrapping pattern comprising multiple layers in which a top layer has a different length than a bottom layer, where the bottom layer is adjacent a mandrel, and wrapping optical fiber around the mandrel according to the wrapping pattern.

The wrapping pattern may have a cross-section through a longitudinal axis of the mandrel that is narrower at a top of the cross-section than at a base of the cross-section, where the base of the cross-section is adjacent the mandrel and between the mandrel and the top of the cross-section.

The wrapping pattern may be symmetric around a midpoint of a measurement zone of the acoustic sensor.

The wrapping pattern may have a triangular cross-section on one side of a longitudinal axis of the mandrel.

The wrapping pattern may be asymmetric around a midpoint of a measurement zone of the acoustic sensor.

The wrapping pattern may have a ramp shaped cross-section on one side of a longitudinal axis of the mandrel.

A diameter of the mandrel may increase along a length of the mandrel. A combined cross-section of the mandrel and the wrapping pattern through a longitudinal axis of the mandrel may be rectangular.

The diameter of the mandrel may increase along the mandrel in steps.

The particular frequency response may be continuous for a selected frequency range.

The selected frequency range may be about 1 Hz to 500 kHz.

In accordance with another illustrative embodiment of the disclosure, there is provided a non-transitory computer readable medium having stored thereon program code to cause a processor to perform a method for making an acoustic sensor with a frequency response that has less spectral fading than a sensor with a rectangular wrapping pattern, where the rectangular wrapping pattern has a rectangular cross-section. The method includes selecting a wrapping pattern comprising multiple layers in which a top layer has a different length than a bottom layer, where the bottom layer is adjacent a mandrel, and wrapping optical fiber around the mandrel according to the wrapping pattern.

In accordance with another illustrative embodiment of the disclosure, there is provided a sensor shaped to have a frequency response that has less spectral fading than a sensor with a rectangular wrapping pattern, where the rectangular wrapping pattern has a rectangular cross-section. The sensor includes a mandrel and an optical fiber comprising at least a pair of Fiber Bragg Gratings separated by an intervening length of the optical fiber, where the intervening length of the optical fiber is wrapped around the mandrel according to a wrapping pattern comprising multiple layers in which a top layer has a different length than a bottom layer and where the bottom layer is adjacent the mandrel.

The sensor may have a cross-section through a longitudinal axis of the mandrel that is narrower at a top of the cross-section than at a base of the cross-section, where the base of the cross-section is adjacent the mandrel and between the mandrel and the top of the cross-section.

The optical fiber may be wrapped in at least two layers around the mandrel and the particular frequency response is continuous from about 1 Hz to 500 kHz.

The wrapping pattern may have a ramp shape.

A diameter of the mandrel may increase along a length of the mandrel. A combined cross-section of the mandrel and the wrapping pattern through a longitudinal axis of the mandrel may be rectangular.

The diameter of the mandrel may increase along the mandrel in steps.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIG. 1A is a block diagram of an example of a system that comprises fiber Bragg gratings ("FBGs") and that uses optical interferometry for fiber optic sensing applications.

DETAILED DESCRIPTION

Figure 1B:
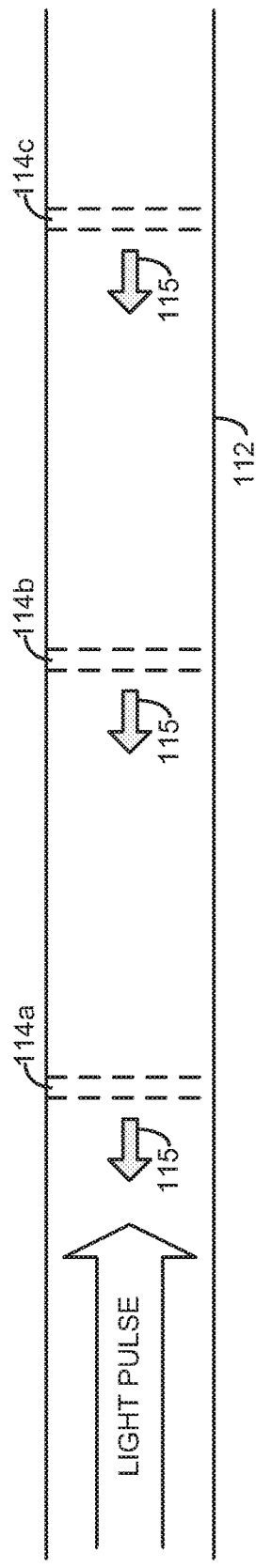
FIG. 1B is a schematic that depicts how the FBGs reflect a light pulse.

Fiber optic acoustic sensors may be made by wrapping a length of optical fiber around a core. Pressure changes, for example, pressure changes caused by an event such as a sound wave, may be detected along the length of the sensor, resulting in a distributed measurement. The distributed nature of the measurement means that the net pressure over a sensor is zero if the wavelength of the sound wave is the same length as the length of a measurement zone of the sensor. Therefore, a frequency response of the sensor has periodic fading at frequencies corresponding to wavelengths that are multiples of the length of the measurement zone. As appreciated by the present inventors, the frequency response of the sensor is due to the wrapping pattern of the optical fiber around the core and may be shaped by modifying the wrapping pattern. Selecting a suitable wrapping pattern may allow a sensor to be tuned to particular bands of interest.

FIG. 1A is a block diagram of an example of a system that uses optical interferometry for fiber optic sensing applications. Optical interferometry is a technique in which two separate light pulses are generated: a sensing pulse and a reference pulse. These pulses may be generated by an optical source such as a laser. When optical interferometry is used for fiber optic sensing applications, the sensing and reference pulses are at least partially reflected back towards an optical receiver.

Accordingly, in FIG. 1A, an optical source 101 emits a sensing light pulse and a delayed reference pulse on to an optical fiber 112 that comprises a first pair of fiber Bragg gratings ("FBGs") via an optical circulator 107. The first pair of FBGs comprises first and second FBGs 114a,b (generally, "FBGs 114"). The first and second FBGs 114a,b are separated by a fiber segment 116 of the optical fiber 112. The light pulse has a wavelength identical or very close to the center wavelength of the FBGs 114, which is the wavelength of light the FBGs 114 are designed to partially reflect. The sensing and delayed reference pulses are accordingly each partially reflected by the FBGs 114a,b and return to the optical circulator 107, which directs them to an optical receiver 103. The delay time between the reference pulse and the sensing pulse is such that the delayed reference pulse that reflects off the first FBG 114a (hereinafter the "reflected, delayed reference pulse") arrives at the optical receiver 103 simultaneously with the sensing pulse that reflects off the second FBG 114b (hereinafter the "reflected sensing pulse"), which permits optical interference to occur. While the FBGs 114 are used as partial reflectors of light pulses in the depicted embodiment, in alternative embodiments (not depicted) different types of partial reflectors may be used.

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the optical receiver 101. In embodiments comprising three or more FBGs 114, the portions of the sensing and delayed reference pulses not reflected by the first and second FBGs 114a,b can reflect off the third FBG 114c and any subsequent FBGs 114, resulting in interferometry that can be used to detect strain along the fiber 112 occurring further from the optical source 101 than the second FBG 114b. For example, in the embodiment of FIG. 1B, a portion of the sensing pulse not reflected by the first and second FBGs 114a,b can reflect off the third FBG 114c and a portion of the delayed reference pulse not reflected by the first FBG 114a can reflect off the second FBG 114b, and these reflected pulses can interfere with each other at the optical receiver 103.

Any changes to the optical path length of the fiber segment 116 result in a corresponding phase difference between the reflected, delayed reference pulse and the reflected sensing pulse at the optical receiver 103. Since the two reflected pulses are received as one combined interference pulse, the phase difference between them is embedded in the combined signal. This phase information can be extracted using proper signal processing techniques, such as phase demodulation. The relationship between the optical path of the fiber segment and that phase difference (θ) is as follows:

$$\theta = 2\pi n L/\lambda$$

where n is the index of refraction of the optical fiber; L is the physical path length of the fiber segment; and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain", refers to strain that changes over time.

Figure 1C:
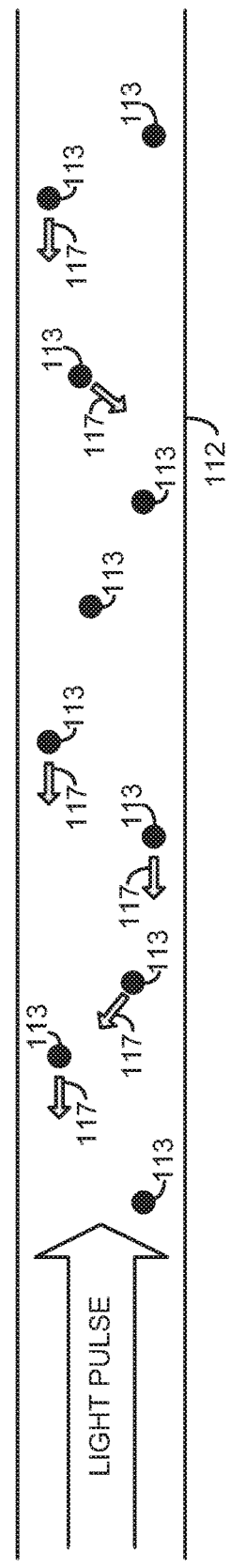
FIG. 1C is a schematic that depicts how a light pulse interacts with impurities in an optical fiber that results in scattered laser light due to Rayleigh scattering, which is used for distributed acoustic sensing.

Referring to FIG. 1C, one conventional way of determining Δ nL is by using what is broadly referred to as distributed acoustic sensing ("DAS"). DAS involves laying the fiber through or near a region of interest and then sending a coherent laser pulse along the fiber. As shown in FIG. 1B, the laser pulse interacts with impurities 113 in the fiber 112, which results in scattered laser light 117 because of Rayleigh scattering. Vibration or acoustics emanating from the region of interest results in a certain length of the fiber 112 becoming strained, and the optical path change along that length varies directly with the magnitude of that strain. Some of the scattered laser light 117 is back scattered along the fiber 112 and is directed towards an optical receiver (not shown), and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits significantly less light back towards the optical receiver than using the FBGs 114. DAS accordingly uses Rayleigh scattering to estimate the magnitude, with respect to time, of the strain experienced by the fiber during an interrogation time window, which is a proxy for the magnitude of the vibration or acoustics emanating from the region of interest. In certain embodiments, the sensor system is configured to utilize DAS.

In certain embodiments, the sensor system may be configured to measure dynamic strain by using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain.

Figure 2:
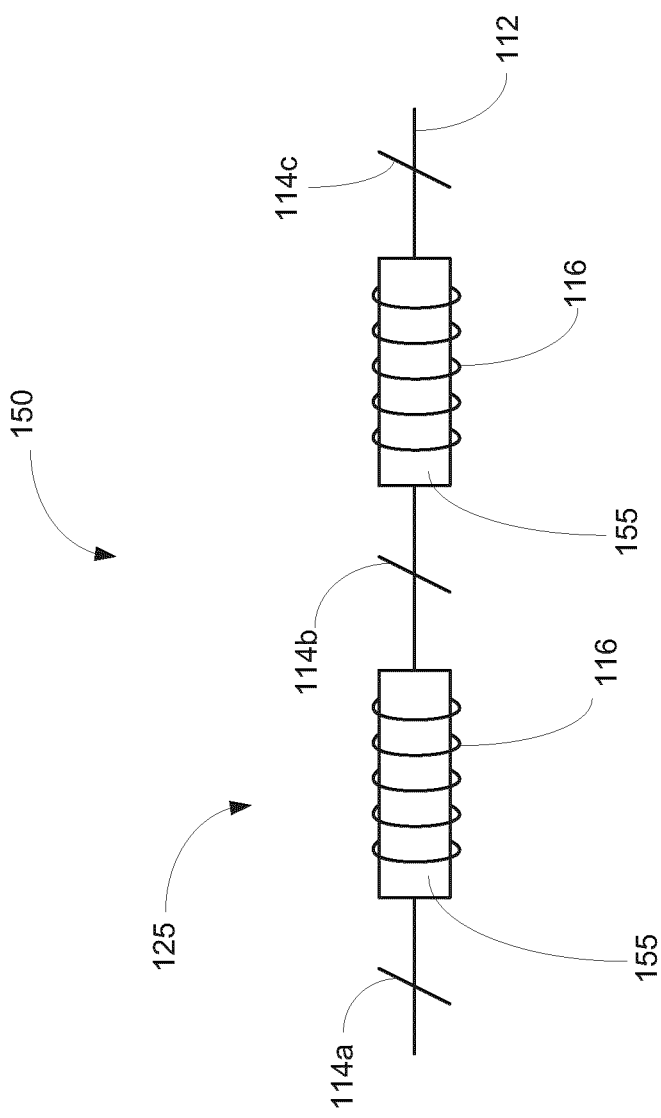
FIG. 2 depicts an example of an acoustic sensor array comprising a plurality of FBGs etched in an optical fiber.

Referring to FIG. 2, an acoustic sensor array 150 comprises a plurality of FBGs 114a, 114b, 114c etched in an optical fiber 112. The FBGs 114a, 114b, 114c are separated by fiber segments 116. Each of the fiber segments 116 is wound about a core or a mandrel 155 to form a wrap. A sensor (e.g. sensor 125) comprises a pair of FBGs (e.g. FBGs 114a and 114b) and a mandrel (e.g. mandrel 155) between the pair of FBGs with a fiber segment 116 wound around it. The length of the sensor 125 is the distance between the pair of FBGs 114a and 114b. In this embodiment, the sensor array 150 uses three FBGs 114 to form two sensors. Alternatively, in other embodiments (not depicted), a pair of FBGs 114 may be exclusive to a single sensor 125 so that two sensors 125 are formed using four FBGs 114 with an intervening length of optical fiber between the two sensors. A sensor array may comprise any number of sensors 125 suitable for a particular application and multiple sensor arrays may be included on an optical fiber 112. Examples of prior art acoustic sensor arrays include the MiQro™ tool manufactured by Hifi Engineering Inc. of Calgary, Alberta.

The spacing of the sensors 125 may be anywhere in a range between about 0.1 to about 25 meters. In some embodiments, the spacing may be about, for example, 38 cm. The mandrel 155 may have any suitable length and diameter. For example, in some embodiments, the mandrel 155 is about 25 cm long and is generally cylindrical. The diameter of the mandrel 155 may be sized for particular applications. For example, for a regular tool with an outer diameter of about 2.125", the mandrel 155 may have an outer diameter of about 1.125". For a slim hole tool with an outer diameter of about 1.6875", the mandrel 155 may have an outer diameter of about 0.5625". In certain embodiments, at least one of the diameter and length of the mandrel 155 may be increased to accommodate a greater intervening length of optical fiber 112.

The mandrel 155 may be comprised of any suitable material or combination of materials that cooperate to provide the desired effect; examples include metals, rubbers of various durometer, elastomers, silicones or other polymers, or the like. In other embodiments, the mandrel 155 may comprise a hollow shell filled with a fluid, an acoustic gel, or an oil, or a solid or semi-solid medium capable of transmitting or permitting passage of the relevant frequencies. The relevant frequencies may be generally in the range of 20-20,000 kHz.

Figure 3:
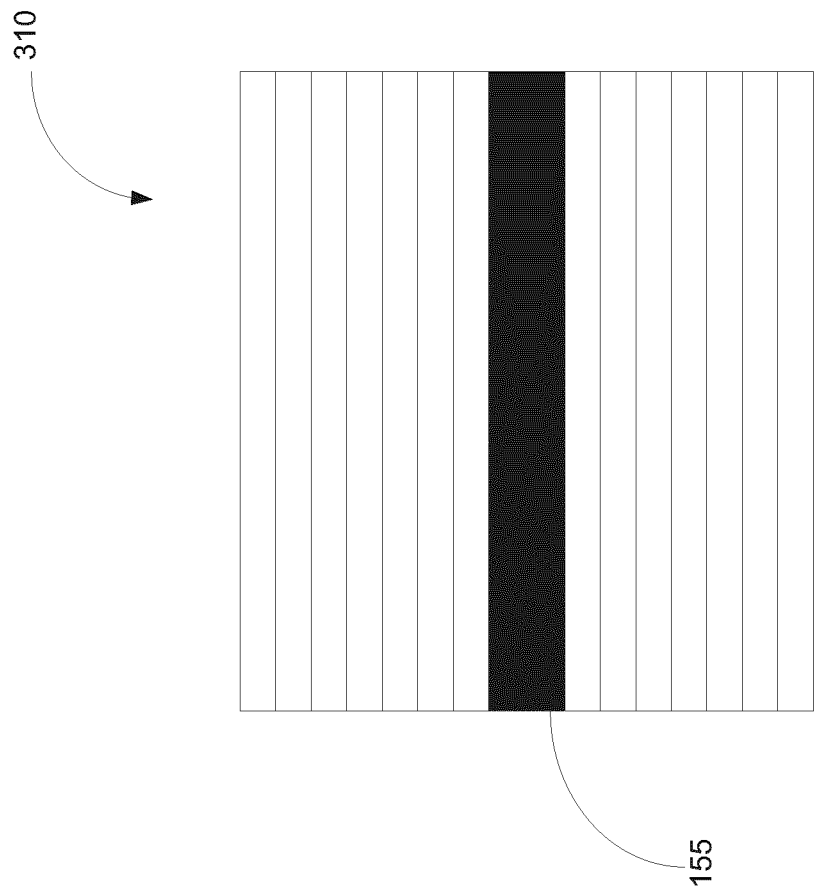
FIG. 3 depicts an example of a layered wrap that may be formed by winding a fiber segment around a mandrel.

Wrapping or winding the fiber segment 116 between a pair of FBGs 114a,b around a mandrel 155 may increase the length of optical fiber sensing the signal due to the increase in effective fiber cross section axially along the mandrel 155. Referring to FIG. 3, a layered wrap 310 may be formed by winding a fiber segment around the mandrel 155 in multiple layers. The layered wrap 310 has optical fiber wrapped around the mandrel in seven layers. In some embodiments, the number of layers formed by the optical fiber wrapping is a function of the total length of the optical fiber used and the diameter of mandrel 155 used. For example, wrapping 200 m of optical fiber around the mandrel 155 shown in FIG. 3 results in seven layers.

Optical fibers used as acoustic sensors generally comprise one or more fiber optic strands, each of which is made from quartz glass (amorphous $SiO_2$). The fiber optic strands are doped with various elements and compounds (including germanium, praseodymium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend-insensitive), SMF28 series single mode fibers such as SMF-28 ULL fiber or SMF-28e fiber, and InfiniCor® series multimode fibers.

Figure 4:
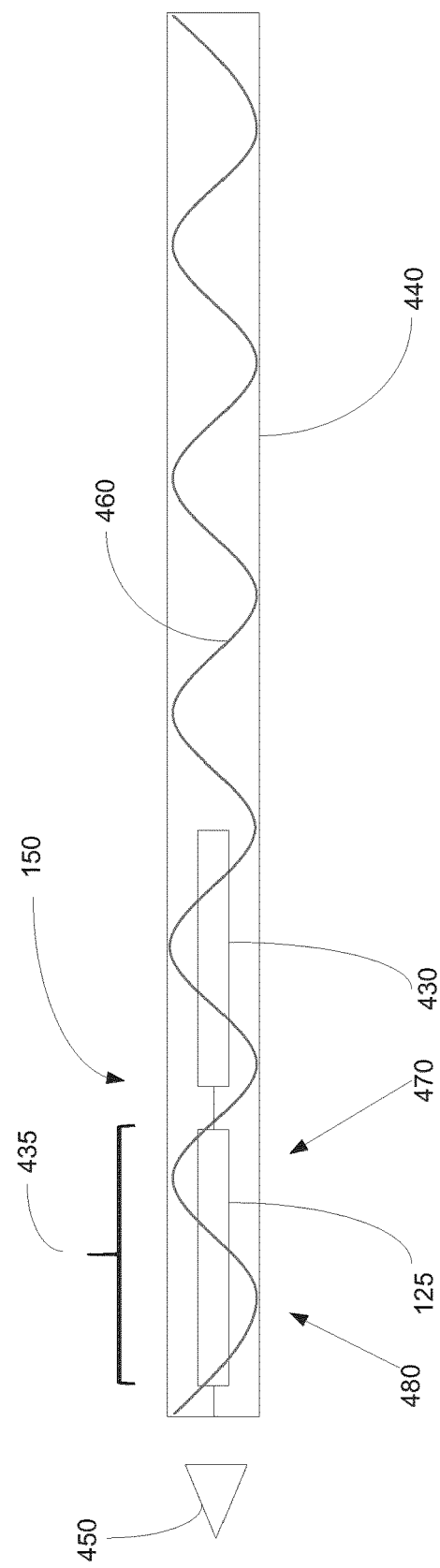
FIG. 4 depicts an example of acoustic sensor array within a pipe, the acoustic sensor array comprising a first sensor and a second sensor.

Referring to FIG. 4, an acoustic sensor array 150 comprising a first sensor 125 and a second sensor 430 is shown inside a pipe 440. A speaker 450 plays a single tone in the pipe, shown as a sine wave 460. The sensors 125,430 are sensitive to changes in pressure exerted on them. Due to the nature of distributed measurements, the net pressure over a measurement region 435 is recorded. Where the FBGs 114 are present, the measurement region 435 is the distance between the FBGs 114 which, in FIG. 4A, is the length of the first sensor 125 or the length of the second sensor 430.

If the speaker 450 plays a tone with a wavelength that is equal to the length of the first sensor 125, a region of increased pressure 470 along the length of the first sensor 420 combines with a region of decreased pressure 480 to produce a net pressure of zero over the length of the first sensor 125. Similarly, the net pressure due to frequencies that have a wavelength that is a multiple of the length of the first sensor 125 will also produce a net pressure of zero over the length of the first sensor 125.

Mathematically, a sinusoidal pressure wave over distance and time, such as a sound wave, is represented as:

$$p(x,t)=\sin(\omega t+kx)$$

where p is the pressure, ω is the frequency of the sinusoid, t is the time, k is the wave number, and x is the distance. The wave number k is equal to ω/v where v is the speed of sound.

The net pressure over a distance do is obtained by integrating the sinusoidal pressure wave over the distance $d_0$:

$$p_{net}(t)=\int_0^{d0} \sin(\omega t+kx)dx$$

Figure 5B:
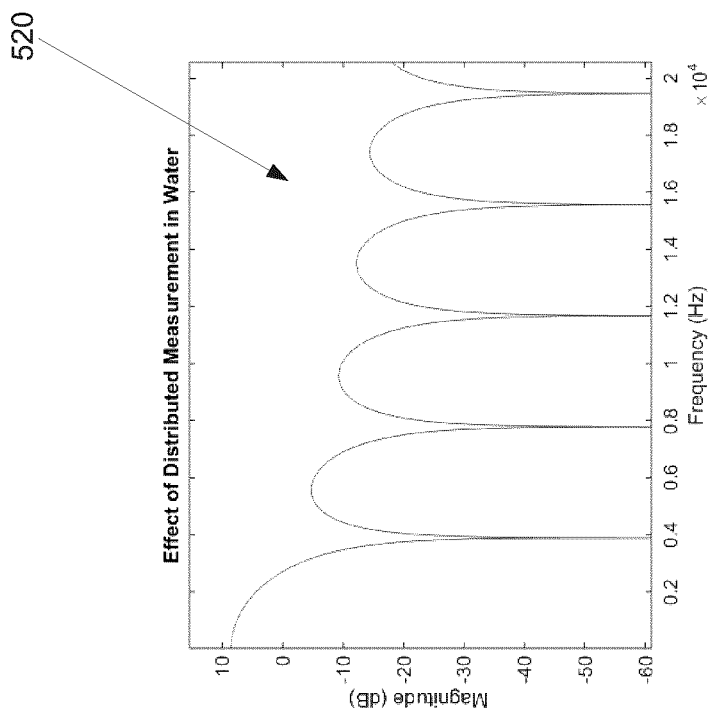
FIG. 5B depicts an example frequency response obtained by integrating a pressure wave at each frequency for the acoustic signal of FIG. 5A measured in water.
Figure 5A:
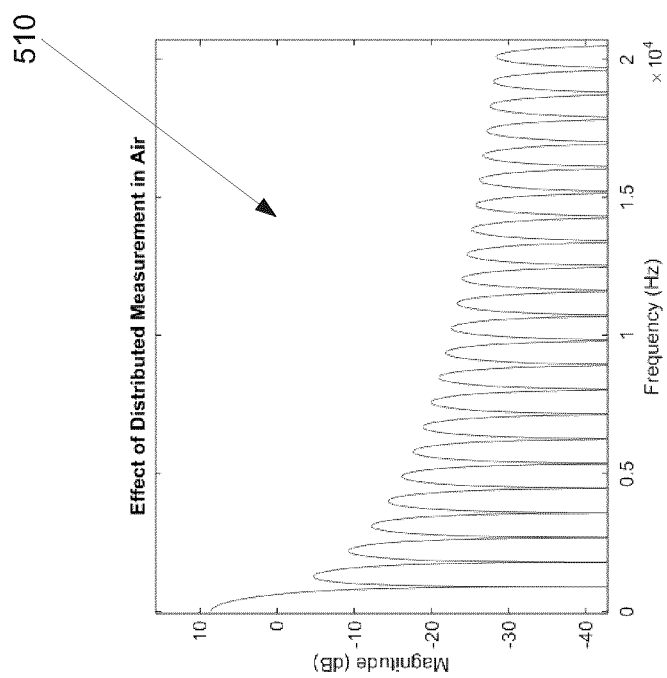
FIG. 5A depicts an example frequency response obtained by integrating a pressure wave at each frequency for an acoustic signal measured in air.

If the pressure wave is integrated at each frequency, a frequency response is obtained. FIG. 5A shows a frequency response 510 obtained by integrating the pressure wave at each frequency for an acoustic signal measured in air, with $d_0$ equal to 38.4125 cm and the frequency ω in air being 892.94 Hz. FIG. 5B shows a frequency response 520 for the same acoustic signal measured in water, with $d_0$ equal to 38.4125 cm and the frequency ω in water being 3,892 Hz. In both cases, fading of the signal is seen, as expected. The signal measurement fades at frequencies that have a wavelength that is a multiple of the length of the measuring sensor. Attenuation of the signal is also seen at higher frequencies.

Figure 6:
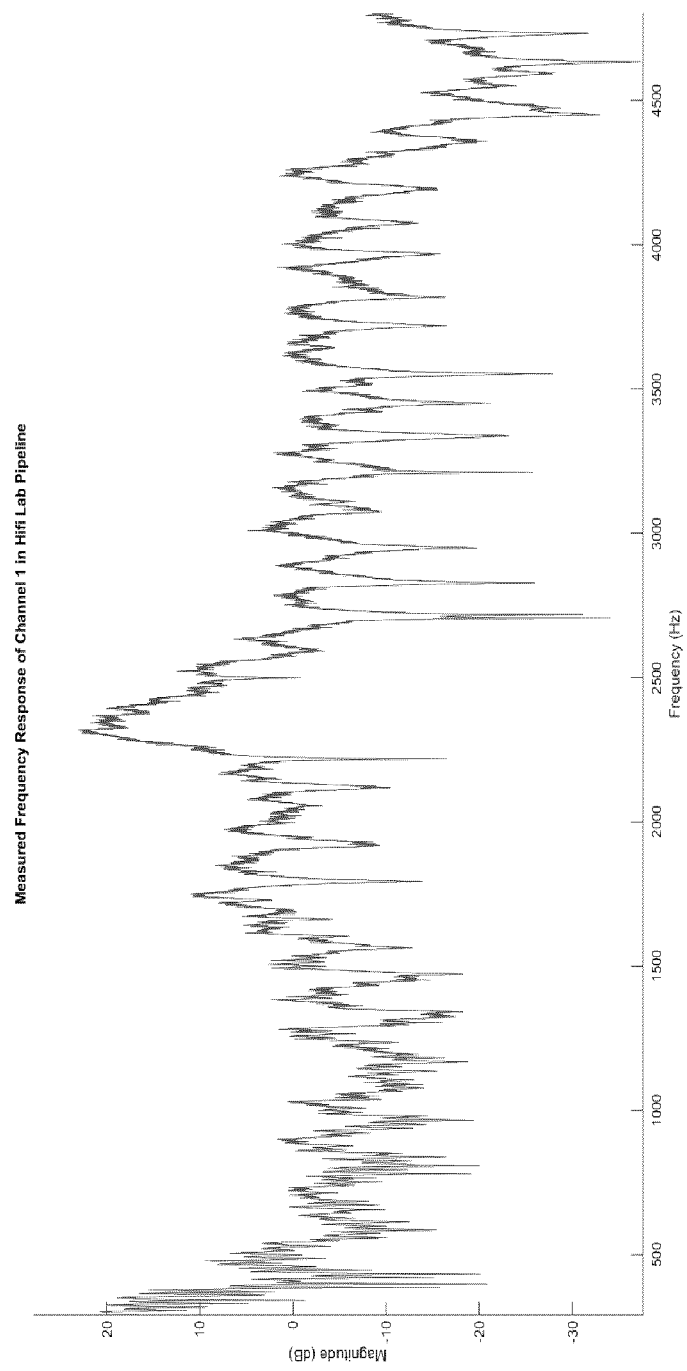
FIG. 6 depicts a frequency response, obtained from experimental testing, of an example sensor.

FIG. 6 shows a graph of a frequency response obtained from experimental testing. Measurements were taken in a 13.6 m long air filled pipe using sensors with a measurement zone of approximately 2.85 m. The frequencies at which fading is expected can be determined using the relationship between frequency and wavelength of sound waves, $$f=v/\lambda$$

where f is the frequency, v is the velocity of sound in air, and λ is the wavelength. Using 343 m/s for the velocity of sound and the length of the sensors, 2.85 m, as the wavelength provides a frequency value of 120.3 Hz. Fading is expected for frequencies that are multiples of 120.3 Hz. The experimental results showed an average value of 121.6 Hz between peaks, which is close to the expected value.

The frequency response of the sensor 125 is due to the cross-sectional shape, or wrapping pattern, formed by the optical fiber wrapped around the mandrel 155. The wrapping pattern dictates the way an acoustic signal propagates and is integrated along the fiber. Changing the wrapping pattern affects the frequency response of the sensor 125. The term "wrapping pattern" is used in this disclosure to refer to the mathematical expression representing the cross-sectional shape of the sensor. The term "layered wrap" is used in reference to the cross-sectional shape formed by wrapping optical fiber in a series of layers around a core. A layered wrap may, for example, be the cross-sectional shape that results from applying a wrapping pattern.

Spectral fading in sensors may be reduced by using specialized fiber spooling geometries or wrapping patterns. In some embodiments, an acoustic sensor 125 with a frequency response that has less spectral fading than a sensor 125 with a rectangular wrapping pattern may be made by selecting a wrapping pattern comprising multiple layers, where the top layer has a different length than a bottom layer. The bottom layer is adjacent to the mandrel 155. In certain embodiments, each layer may have a different length. The sensor is formed by wrapping the optical fiber 112 around the mandrel 155 according to the selected wrapping pattern.

Figure 7:
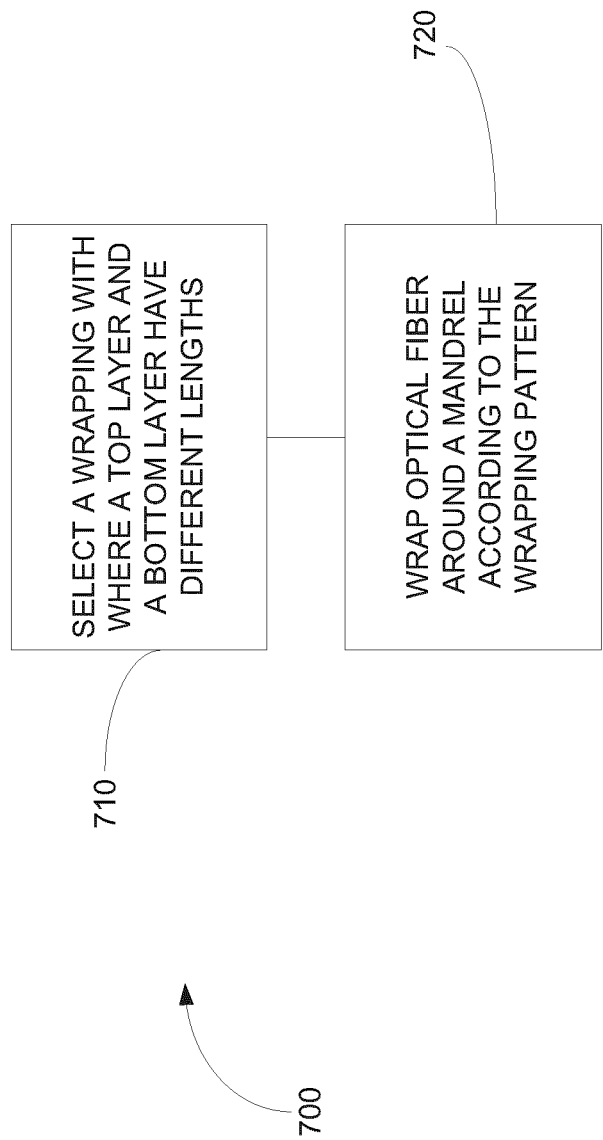
FIG. 7 depicts an example method for making a distributed measurement acoustic sensor.

Referring to FIG. 7, a method 700 for making a distributed measurement acoustic sensor with a frequency response that has less spectral fading than a sensor 125 with a rectangular wrapping pattern is shown. At block 710, a wrapping pattern is selected that will produce a sensor with a frequency response that has less spectral fading than a sensor 125 with a rectangular wrapping pattern. The selected wrapping pattern may have multiple layers, where the top layer has a different length than a bottom layer. The bottom layer is adjacent to the mandrel 155. In some embodiments, the wrapping pattern may have an isosceles triangle cross-section above a longitudinal axis of the mandrel 155. In certain embodiments, the wrapping pattern may have a ramp shaped cross-section above a longitudinal axis of the mandrel 155.

At block 720, optical fiber 112 is wrapped around a mandrel 155 according to the wrapping pattern. The optical fiber 112 is wrapped around the mandrel 155 using any suitable method. For example, in some embodiments, the optical fiber 112 may be wrapped around the mandrel 155 in a tight pitch, moving from one end to the other end. Then, a new layer may be started, moving in the opposite direction.

Figure 8A:
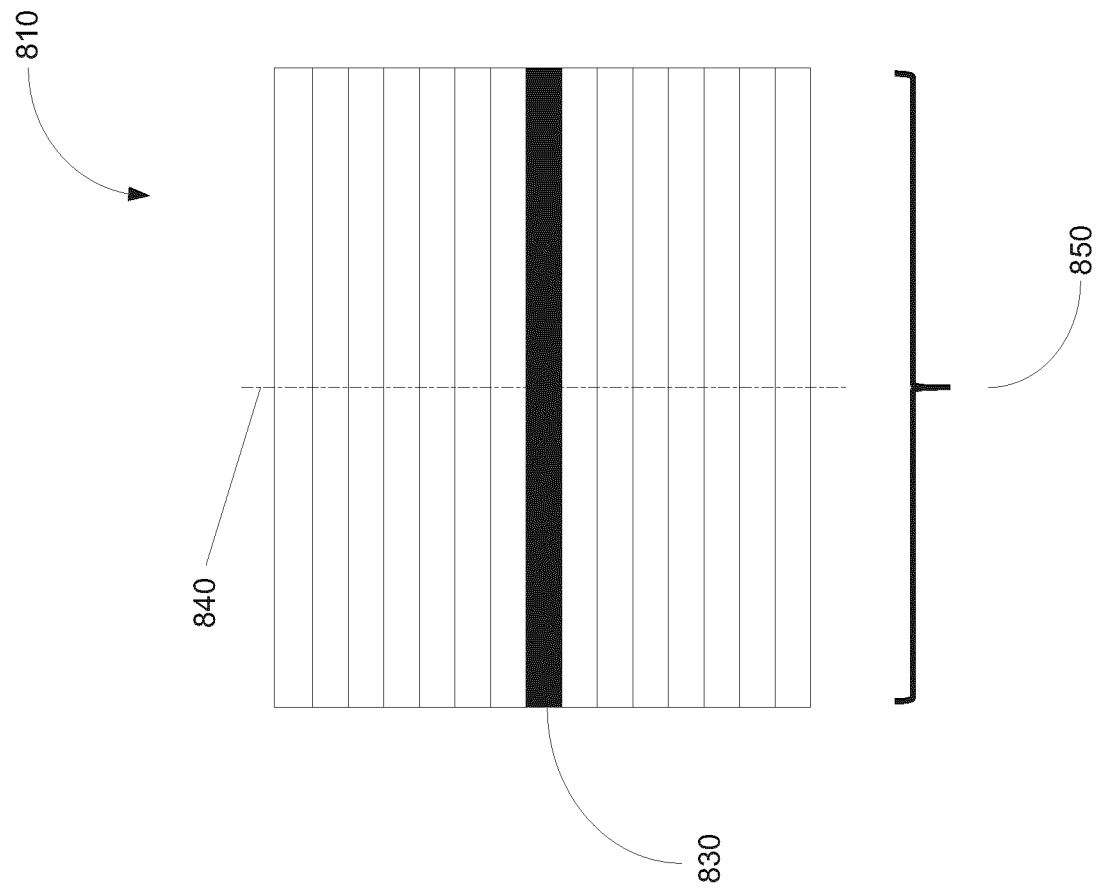
FIG. 8A depicts an example sensor that has a rectangular wrapping pattern.

Referring to FIG. 8A, a sensor 810 is shown that has a standard rectangular wrapping pattern. In this embodiment, optical fiber 112 is wrapped around the mandrel 830 in seven layers. In other embodiments, more or fewer layers may be used. The rectangular wrapping pattern is symmetric about a longitudinal midpoint 840 of the measurement zone 850, or about d/2, where d is the length of the measurement zone 850.

In some embodiments, the wrapping pattern may have a cross-section that is narrower at a top of the cross-section than at a base of the cross-section, wherein the base of the cross-section is adjacent the mandrel 155 and between the mandrel 155 and the top of the cross-section. The wrapping pattern may be symmetric or asymmetric about d/2. Examples of such wrapping patterns include, but are not limited to, triangular, ramp shaped, and semi-circular wrapping patterns.

Figure 8B:
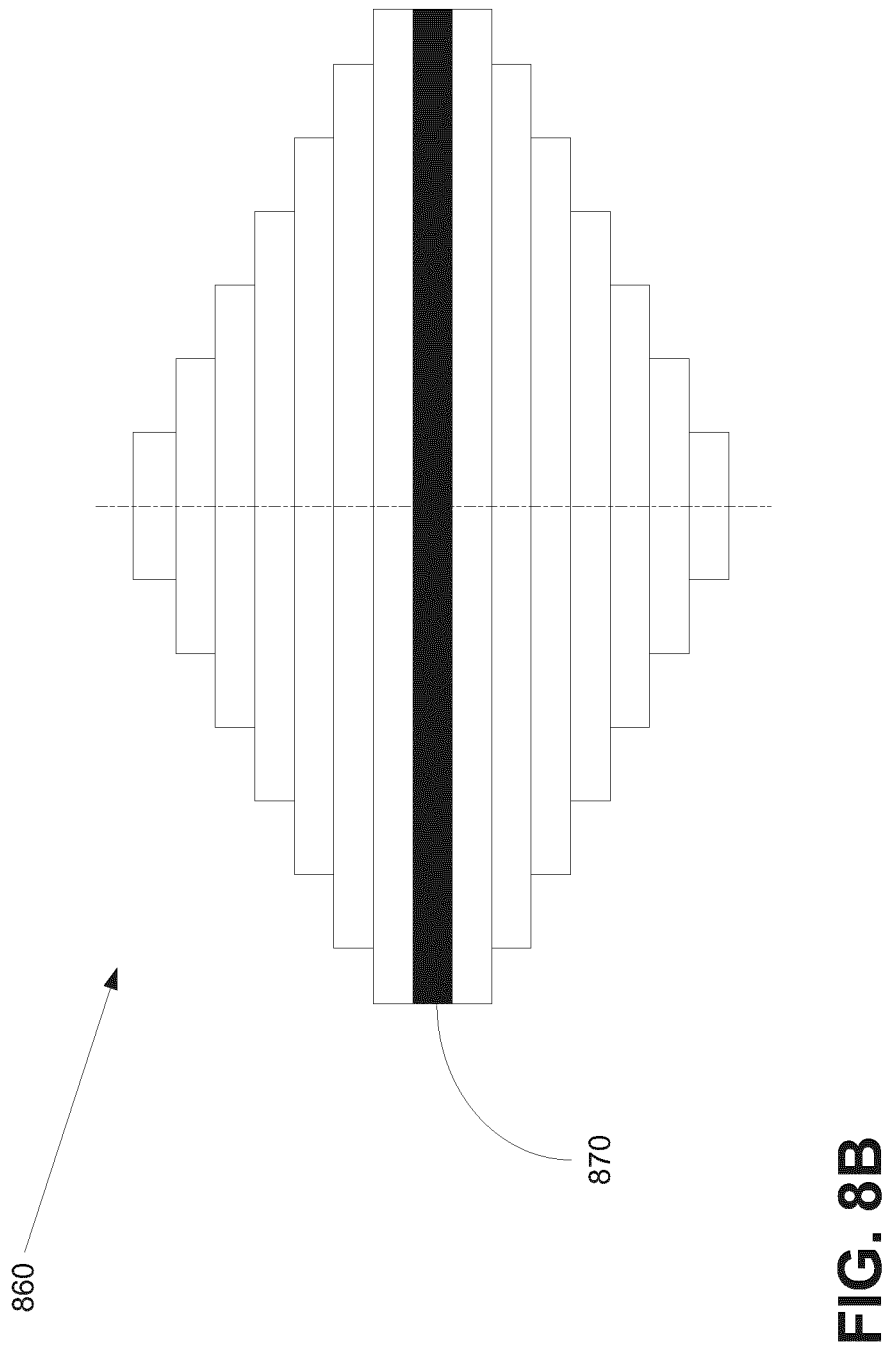
FIG. 8B depicts an example sensor that has a layered wrap with a cross-section that is approximately triangular on either side of a longitudinal axis of a mandrel.

Referring now to FIG. 8B, a sensor 860 is shown that is a layered wrap with a cross-section that is approximately triangular on either side of a longitudinal axis of the mandrel 870. The approximately triangular cross-section of the sensor 860 is based on a triangular wrapping pattern that is symmetric about the midpoint of a measurement zone of the sensor 860, d/2. In this embodiment, the length of the measurement zone is equal to the length of the mandrel 870. In this embodiment, the triangular wrapping pattern uses seven layers of optical fiber. However, in other embodiments, more or fewer layers may be used. In certain embodiments, the overhangs between adjacent layers have an equal length.

Figure 9:
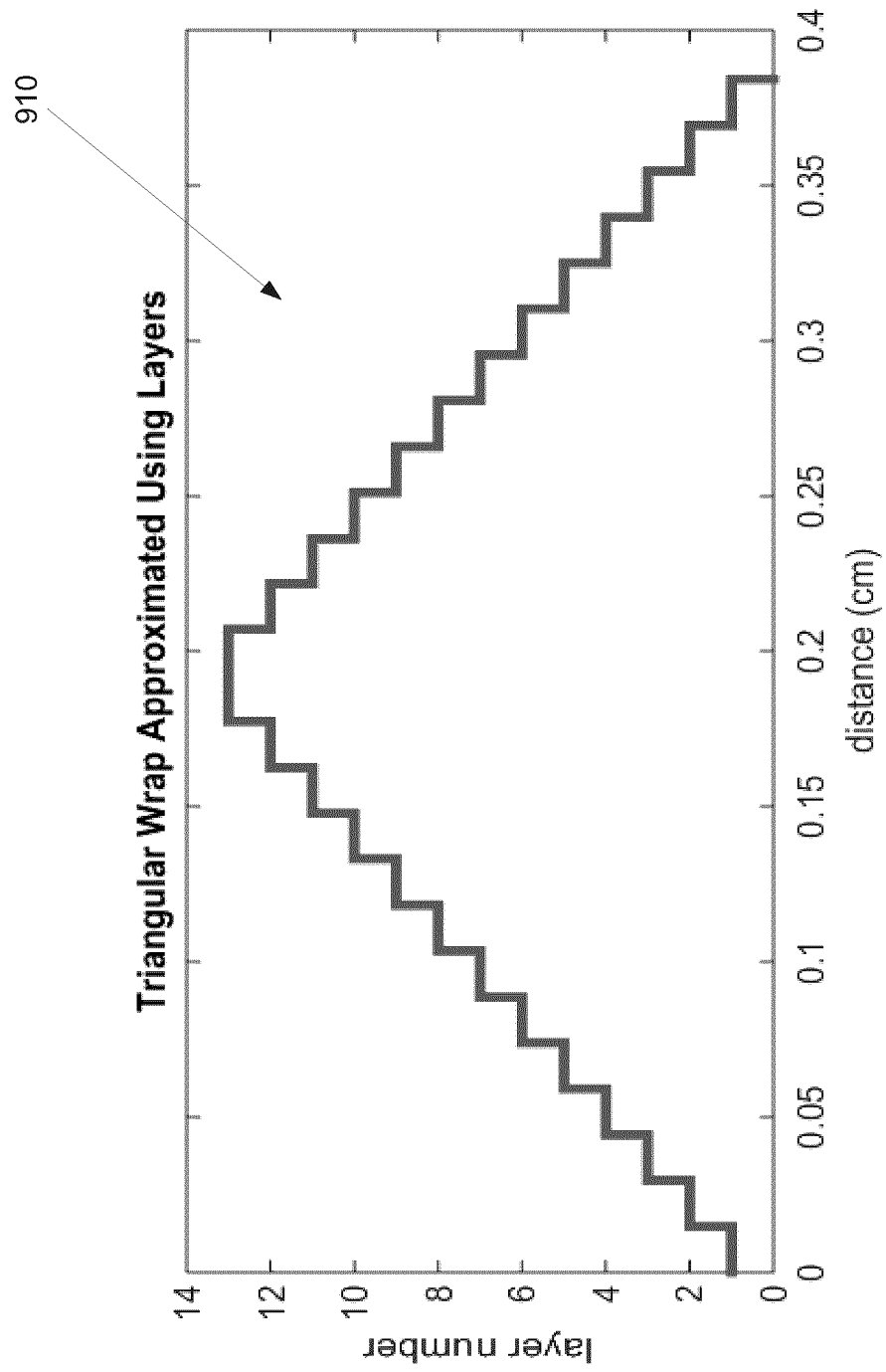
FIG. 9 depicts a graph of an example layered wrap that approximates a triangular wrapping pattern.

Limitations in the physical wrapping process means that some layered wraps may, in some embodiments, be approximations of wrapping patterns, as is seen for the triangular sensor 860 shown in FIG. 8B. As another example, a graph of a layered wrap 910 that approximates a triangular wrapping pattern with thirteen wrap layers is shown in FIG. 9. The wrapping pattern used for the layered wrap 910 is designed to use 200 m of fiber optic cable over 13 layers. In other embodiments, greater or shorter lengths of fiber optic cable may be used to form any suitable number of layers. The height and depth of the wrap may be based on, for example, the desired frequency response, the length of fiber that is being wrapped around the mandrel 155, and the length of the mandrel 155 itself.

Figure 10:
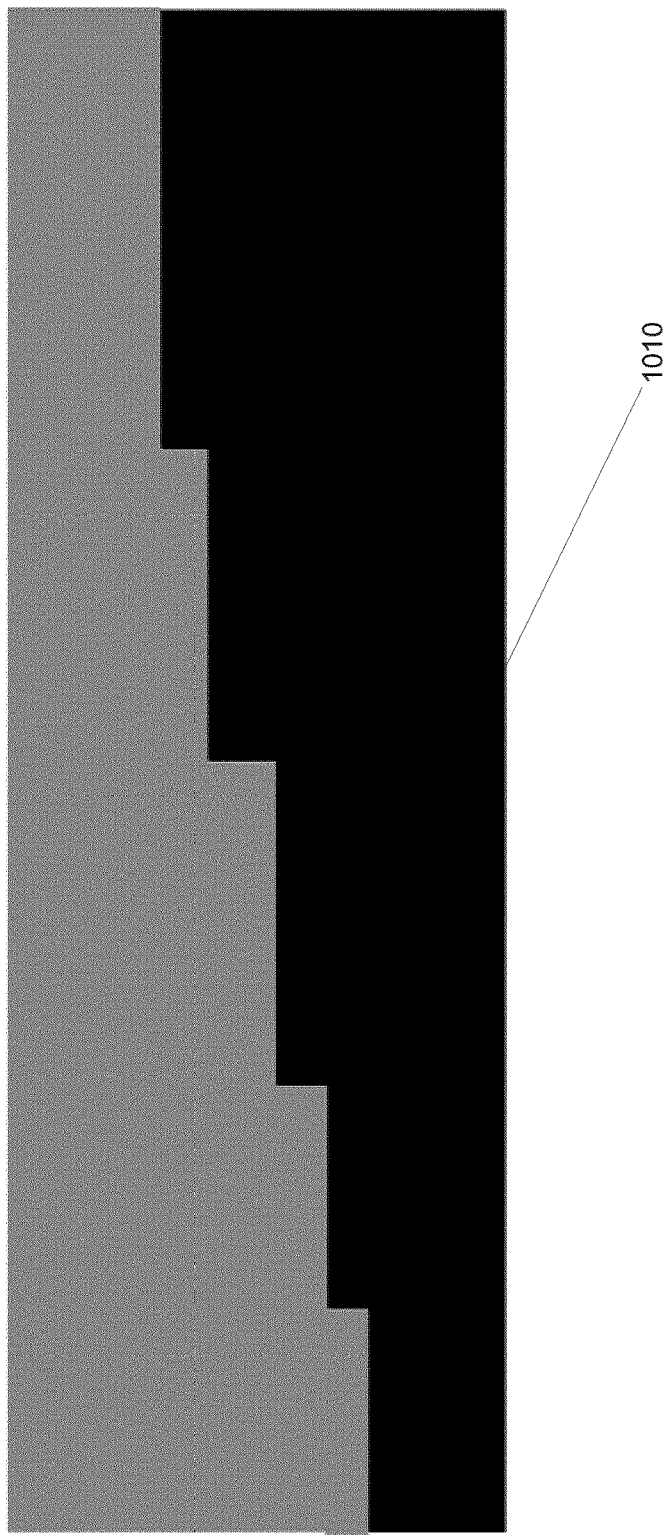
FIG. 10 depicts an example notched mandrel with a diameter increasing in steps along its length.

In some embodiments, a mandrel 155 with a diameter that varies along its length may be used. For example, referring to FIG. 10, the mandrel may be a notched mandrel 1010, with the diameter of the notched mandrel 1010 increasing in steps along the length of the notched mandrel 1010. Optical fiber may be wound around the notched mandrel 1010 to produce a combined cross-section of the notched mandrel

1010 and the wrapping pattern that is rectangular through a longitudinal axis of the notched mandrel 1010. A configuration using the notched mandrel 1010 may be useful in applications in which a sensor with a constant diameter is desired.

Figure 11:
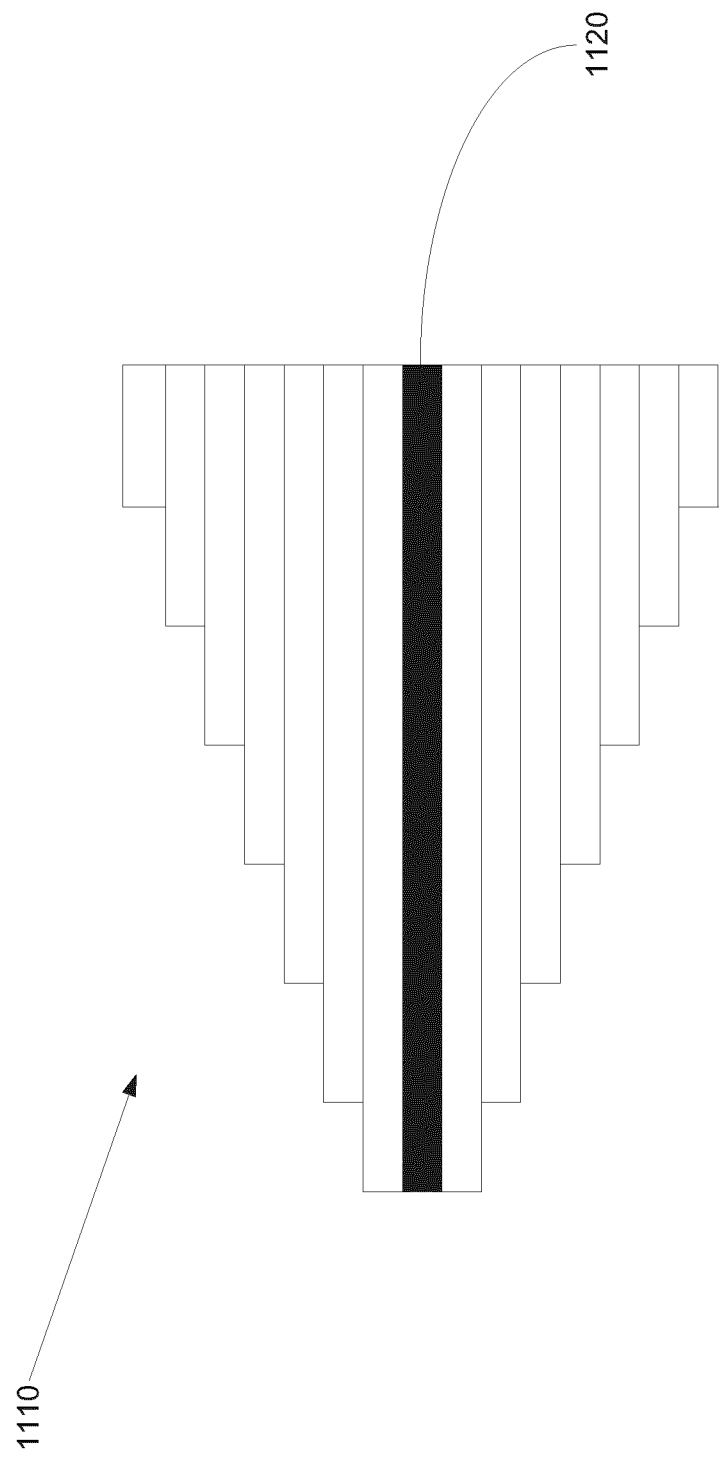
FIG. 11 depicts an example sensor with a cross-section that is approximately ramp shaped on either side of a longitudinal axis of a mandrel.

Referring to FIG. 11, a sensor 1110 is shown with a cross-section that is approximately ramp shaped on either side of the longitudinal axis of the mandrel 1120. The approximately ramp shaped cross-section of the sensor 1110 is based on a ramp wrapping pattern that is not symmetric about the midpoint of the length of the measurement zone, d/2. In this embodiment, the length of the measurement zone is equal to the length of the mandrel 1120 and the ramp wrapping pattern uses seven layers of optical fiber. However, in other embodiments, more or fewer layers may be used.

In addition to triangular and ramp shaped wrapping patterns, any suitable wrapping pattern may be designed that has a frequency response that has less spectral fading than a sensor 125 with a rectangular wrapping pattern.

A computer readable medium may be used to store on it program code to cause a processor to perform a method for making an acoustic sensor 125 with a frequency response that has less spectral fading than a sensor 125 with a rectangular wrapping pattern. The method may include the steps of selecting a wrapping pattern comprising multiple layers in which a top layer has a different length than a bottom layer, wherein the bottom layer is adjacent a mandrel 155 and wrapping optical fiber 112 around the mandrel 155 according to the wrapping pattern.

In some embodiments, a sensor 125 may be shaped to have a frequency response that has less spectral fading than a sensor 125. For example, in one embodiment, the sensor 125 includes a mandrel 155 and an optical fiber 112 comprising at least a pair of FBGs 114 separated by an intervening length 116 of the optical fiber. The intervening length 116 of the optical fiber 112 is wrapped around the mandrel 155 according to a wrapping pattern comprising multiple layers in which a top layer has a different length than a bottom layer, where the bottom layer is adjacent the mandrel 155.

The sensor 125 may have a cross-section that is narrower at a top of the cross-section than at a base of the cross-section, wherein the base of the cross-section is adjacent the mandrel and between the mandrel and the top of the cross-section. For example, in some embodiments, the cross-section may include triangular, ramp shaped, and semicircular cross-sections. In other embodiments, the cross-section may include any other suitable shape.

EXPERIMENTAL RESULTS

An acoustic sensor comprising a rectangular wrap and an acoustic sensor comprising a ramp shaped wrap are built and tested in air. The rectangular sensor has five layers and the ramp sensor has eight layers. The rectangular wrap has a base length of 0.794 m. The ramp shaped sensor has a base length of 0.794 m and a top layer length of 0.056 m.

Figure 12:
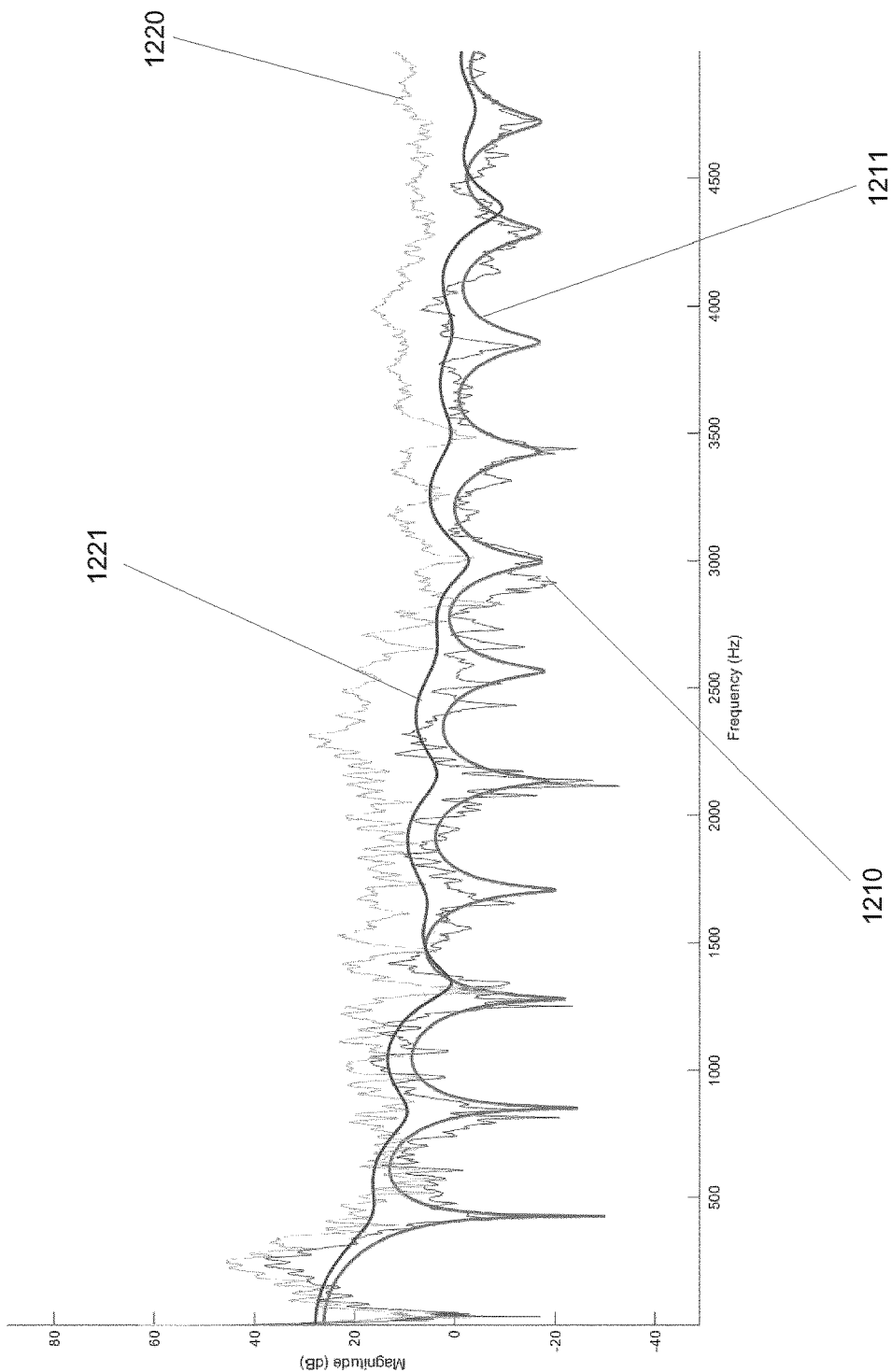
FIG. 12 depicts experimental and theoretical frequency responses for examples of rectangular and ramp shaped sensors.

Referring to FIG. 12, experimental and theoretical frequency responses for both the rectangular and ramp shaped sensors are shown. The rectangular sensor's experimental frequency response 1210 and the ramp shaped sensor's experimental frequency response 1220 are smoothed to reduce the effect of echoes. The rectangular sensor's experimental frequency response 1210 shows spectral fading, as expected based on the rectangular theoretical response 1211. The ramp shaped sensor's experimental frequency response 1220 shows reduced spectral fading as compared to the rectangular sensor, which is as expected based on the ramp shaped sensor's theoretical frequency response 1221. The ramp experimental frequency response 1220 also shows less attenuation than the rectangular experimental frequency response 1210.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method for making an acoustic sensor with a frequency response that has less spectral fading than a sensor with a rectangular wrapping pattern, wherein the rectangular wrapping pattern has a rectangular cross-section, the method comprising:
    (a) selecting a wrapping pattern comprising multiple layers in which a top layer has a different length than a bottom layer, wherein the bottom layer is adjacent a mandrel; and
    (b) wrapping optical fiber around the mandrel according to the wrapping pattern.

2. The method of claim 1 wherein the wrapping pattern has a cross-section through a longitudinal axis of the mandrel that is narrower at a top of the cross-section than at a base of the cross-section, wherein the base of the cross-section is adjacent the mandrel and between the mandrel and the top of the cross-section.

3. The method of claim 1 wherein the wrapping pattern is symmetric around a midpoint of a measurement zone of the acoustic sensor.

4. The method of claim 1 wherein the wrapping pattern has a triangular cross-section on one side of a longitudinal axis of the mandrel.

5. The method of claim 1 wherein the wrapping pattern is asymmetric around a midpoint of a measurement zone of the acoustic sensor.

6. The method of claim 1 wherein the wrapping pattern has a ramp shaped cross-section on one side of a longitudinal axis of the mandrel.

7. The method of claim 1 wherein a diameter of the mandrel increases along a length of the mandrel and wherein a combined cross-section of the mandrel and the wrapping pattern through a longitudinal axis of the mandrel is rectangular.

8. The method of claim 7 wherein the diameter increases along the mandrel in steps.

9. The method of claim 1 wherein the particular frequency response is continuous for a selected frequency range.

10. The method of claim 9 wherein the selected frequency range is about 1 Hz to 500 kHz.

11. A non-transitory computer readable medium having stored thereon program code to cause a processor to perform a method for making an acoustic sensor with a frequency response that has less spectral fading than a sensor with a rectangular wrapping pattern, wherein the rectangular wrapping pattern has a rectangular cross-section, the method comprising:
    (a) selecting a wrapping pattern comprising multiple layers in which a top layer has a different length than a bottom layer, wherein the bottom layer is adjacent a mandrel; and (b) wrapping optical fiber around the mandrel according to the wrapping pattern.

12. A sensor shaped to have a frequency response that has less spectral fading than a sensor with a rectangular wrapping pattern, wherein the rectangular wrapping pattern has a rectangular cross-section, the sensor comprising:
   (a) a mandrel; and
   (b) an optical fiber comprising at least a pair of Fiber Bragg Gratings separated by an intervening length of the optical fiber, wherein the intervening length of the optical fiber is wrapped around the mandrel according to a wrapping pattern comprising multiple layers in which a top layer has a different length than a bottom layer, wherein the bottom layer is adjacent the mandrel.

13. The sensor of claim 12 wherein the sensor has a cross-section through a longitudinal axis of the mandrel that is narrower at a top of the cross-section than at a base of the cross-section, wherein the base of the cross-section is adjacent the mandrel and between the mandrel and the top of the cross-section.

14. The sensor of claim 12 wherein the optical fiber is wrapped in at least two layers around the mandrel and the particular frequency response is continuous from about 1 Hz to 500 kHz.

15. The sensor of claim 12 wherein the wrapping pattern has a ramp shape.

16. The sensor of claim 12 wherein a diameter of the mandrel increases along a length of the mandrel and wherein a combined cross-section of the mandrel and the wrapping pattern through a longitudinal axis of the mandrel is rectangular.

17. The sensor of claim 16 wherein the diameter increases along the mandrel in steps.

* * * * *